United States Patent Office 3,012,598
Patented Dec. 12, 1961

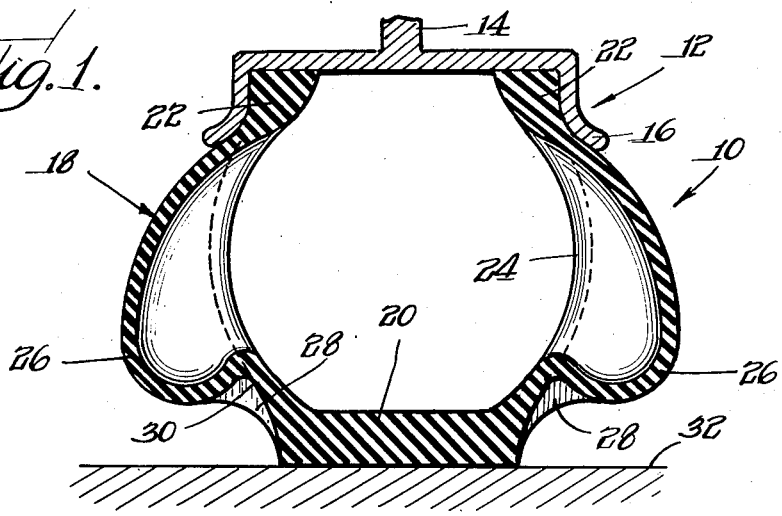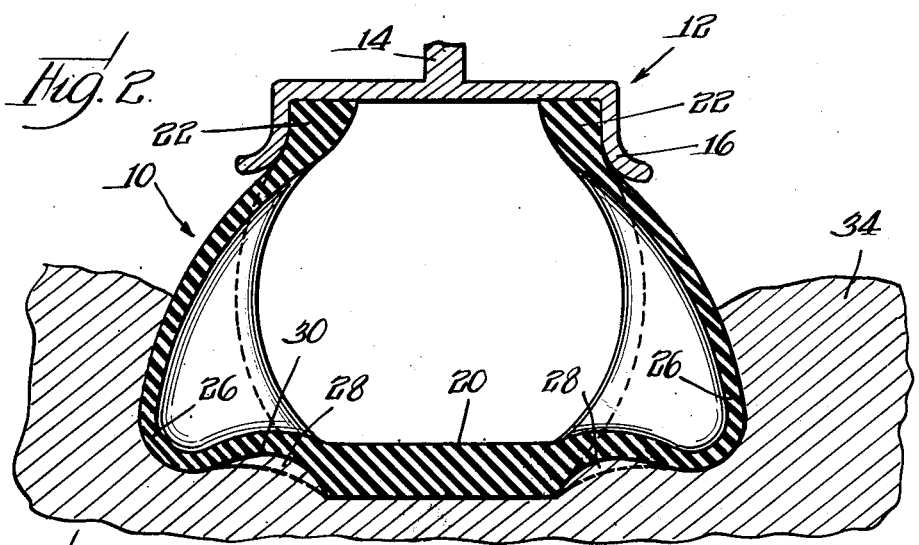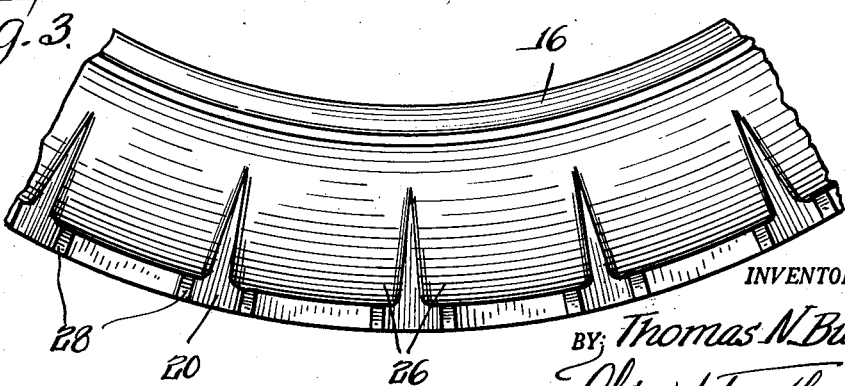

3,012,598
PNEUMATIC MUD TIRE
Thomas N. Busch, Daphne, Ala.
(% Timberline Equipment Co., Bradley, Ill.)
Filed Sept. 16, 1959, Ser. No. 840,315
3 Claims. (Cl. 152—208)

This invention relates generally to pneumatic tires and more particularly to a pneumatic mud tire.

Work vehicles, for example tractors and the like, are frequently required to operate in mud, soft ground or other yieldable bearing material. When such conditions are encountered, the progress of the vehicle is usually hampered because the tires fail to find solid footing and part of the power of the vehicle is dissipated in shearing the tires through the yieldable earth. Conditions may even be so bad that the vehicle actually is prevented from moving and becomes mired in.

Of course, vehicles intended exclusively for this type of service may be specially outfitted with oversized tires having a very wide tread. Under certain circumstances, tracks rather than tires may even be necessary. However, if the work vehicle must traverse paved roads, oversized tires or tracks are known to impede progress. The considerable frictional engagement between oversized tires or tracks and paved surfaces limits advance to very low speeds.

Therefore, an important object of the present invention is to provide an improved mud tire.

Another object of the invention is to provide a mud tire which is suitable for use on paved roads and which also develops additional contact surface when mud or soft ground is encountered.

Yet another object of the invention is to provide an improved pneumatic tire which automatically adapts to the road conditions it encounters.

Addtional objects and features of the invention pertain to the particular structure and arrangements whereby the above objects are attained.

The structure in accordance with the invention includes a pneumatic tire casing having a plurality of independently operable, splayable lobes arranged circumferentially along the sidewalls of the casing.

The invention, both to its structure and mode of operation, will be better understood by reference to the following disclosure and drawing forming a part thereof, wherein:

FIG. 1 is a cross-sectional view of a mud tire constructed in accordance with the invention and shown contacting a paved road;

FIG. 2 is a cross-sectional view of the mud tire of FIG. 1 shown contacting a mud bed; and FIG. 3 is a fragmentary side view of a mud tire constructed in accordance with the invention.

Referring now in detail to the drawing, a pneumatic mud tire 10 is shown secured to a wheel 12. Whereas wheel 12 includes a wheel disk 14 terminating in a straight-side rim 16, tire 10 includes a tire casing 18.

Casing 18 is fabricated from the customary rubberized fabric carcass with the fabric cut on the bias. The fabric carcass comprising casing 18 has a central, road-engaging tire tread 20 and rim-engaging beads 22 vulcanized thereto. It is recognized that beads 22 may be reinforced with wire threads if so desired. A suitable inflating valve, not shown, is also provided; and while tire 10 may be arranged to employ an inner tube, it is preferred to have tire 10 tubeless.

Casing 18 accordingly defines an air-enclosing chamber 24 and further defines a plurality of lobes 26 disposed circumferentially along the sidewalls in communication with chamber 24. Advantageously, a number of cleats or webs 28 are secured at spaced intervals in the valley portion 30 that is defined between the lobes 26 and central tread 20. Webs 28 serve to increase the gripping power of tire 10 and reduce skidding.

Having thus described one construction of the invention, it is important now to state how the illustrated embodiment operates. As shown in FIG. 1, when a work vehicle supported on previously inflated tires 10 is progressing along a paved road 32, the central tread 20 engages the road while the lobes 26 are more-or-less suspended and do not engage the surface of road 32 to any substantial extent. However, when the vehicle encounters a mud bed 34, as shown in FIG. 2, tire 10 sinks into the mud and the lobes 26, as well as the central tread 20, engages the ground.

As the weight of the vehicle urges tire 10 into contact with mud bed 34, the resulting pressure causes the lobes 26 to splay into the mud so as to greatly increase the contact area. Furthermore, this splaying of the lobes 26 brings webs 28 into contact with the ground whereby additional gripping action is obtained. As will be recognized, the increase in the contact area of tire 10 occasioned by the splaying of lobes 26 substantially reduces sinking into the mud and reduces skidding.

It is important to note that, when tire 10 rides out of the mud bed 34 back onto road 32, pressure is relieved from the lobes 26 and they regain their former shape.

It is also important to point out that, since in the preferred embodiment the lobes 26 are circumferentially discontinuous, these lobes are capable of independent action thereby providing greater adaptability to the surface conditions encountered. However, the lobes 26 may if desired be continuous circumferentially of the tire, forming in effect a continuous rim.

While a specific embodiment of the invention has been shown, it should be understood, of course, that the invention is not limited thereto since may modifications may be made; and it is, therefore, contemplated to cover by the appended claims any such modifications as fall within the true spirit and scope of the invention.

The invention is claimed as follows:

1. A pneumatic tire made of deformable, elastomeric material and comprising: flexible sidewalls and a road engaging tread, said sidewalls being formed with a multiplicity of hollow lobes, the hollows of said lobes communicating with the inflatable cavity of said tire to be pressurized therewith, said lobes defining a series of bulges extending beyond the sides of said tread radially inwardly therefrom to be splayed laterally outwardly when contacted by a plastic traveling surface whereby to increase the gripping action of said tire.

2. A pneumatic tire according to claim 1 wherein said tire includes an external valley between said tread and said lobes and wherein said tire further includes a plurality of cleat-like webs situated at spaced intervals in said valley.

3. A mud tire comprising: an elastomeric tire casing adapted to be secured to a wheel rim, said casing having a central, road-engaging tread and an inflatable chamber; and a plurality of independently operable, splayable means of inflatable nature formed laterally on said casing in communication with said chamber, whereby said tire rides substantially on said tread when traveling on a hard surface and whereby said tire rides on said tread and on portions of said splayable means when travelling on a plastic surface, said splayable means tending to splay laterally outwardly of said casing to form an increased contact area when engaged by said plastic surface.

References Cited in the file of this patent

UNITED STATES PATENTS

| | | |
|---|---|---|
| 2,235,375 | Kraft | Mar. 18, 1941 |
| 2,354,715 | Tarbox | Aug. 1, 1944 |
| 2,650,632 | Langdon | Sept. 1, 1953 |
| 2,943,662 | Renwick | July 5, 1960 |